US011001683B2

(12) United States Patent
Hwang et al.

(10) Patent No.: US 11,001,683 B2
(45) Date of Patent: May 11, 2021

(54) QUINONE CURABLE COMPOSITIONS AND ADHESIVE COMPOSITIONS COMPRISING SAME

(71) Applicants: KOLON INDUSTRIES, INC., Seoul (KR); KOREA ADVANCED INSTITUTE OF SCIENCE AND TECHNOLOGY, Daejeon (KR)

(72) Inventors: Hong Gu Hwang, Yongin-si (KR); Jung Seok Hahn, Yongin-si (KR); Haeshin Lee, Daejeon (KR); Younseon Wang, Seongnam-si (KR)

(*) Notice: Subject to any disclaimer, the term of this patent is extended or adjusted under 35 U.S.C. 154(b) by 268 days.

(21) Appl. No.: 16/337,179

(22) PCT Filed: Sep. 27, 2017

(86) PCT No.: PCT/KR2017/010695
§ 371 (c)(1),
(2) Date: Mar. 27, 2019

(87) PCT Pub. No.: WO2018/062835
PCT Pub. Date: Apr. 5, 2018

(65) Prior Publication Data
US 2020/0032011 A1 Jan. 30, 2020

(30) Foreign Application Priority Data
Sep. 28, 2016 (KR) .................. 10-2016-0124795
Sep. 25, 2017 (KR) .................. 10-2017-0123517

(51) Int. Cl.
C08J 5/08 (2006.01)
C08K 7/22 (2006.01)
C08L 79/02 (2006.01)
C09D 179/02 (2006.01)
C09J 179/02 (2006.01)

(52) U.S. Cl.
CPC .................. *C08J 5/08* (2013.01); *C08K 7/22* (2013.01); *C08L 79/02* (2013.01); *C09D 179/02* (2013.01); *C09J 179/02* (2013.01)

(58) Field of Classification Search
CPC ..... C08J 5/08; C08K 7/22; C08K 5/13; C08K 5/17; C08L 79/02; C09D 179/02; C09J 179/02; C08G 73/0206
See application file for complete search history.

(56) References Cited

U.S. PATENT DOCUMENTS

| 5,691,428 | A | * | 11/1997 | Shimizu | ................. | B01J 19/002 |
| | | | | | | 526/62 |
| 6,146,497 | A | * | 11/2000 | Nguyen | ............... | C08K 5/0025 |
| | | | | | | 162/158 |
| 6,506,577 | B1 | | 1/2003 | Deming et al. | | |
| 9,433,699 | B2 | * | 9/2016 | Lee | ..................... | A61L 24/0015 |
| 9,783,837 | B2 | | 10/2017 | Lee et al. | | |
| 2010/0314586 | A1 | | 12/2010 | Hong et al. | | |
| 2013/0240114 | A1 | * | 9/2013 | Balogh | ................. | C09J 161/12 |
| | | | | | | 156/62.6 |
| 2013/0272965 | A1 | | 10/2013 | Hyeon et al. | | |
| 2014/0242870 | A1 | * | 8/2014 | Hwang | ................... | A61L 27/20 |
| | | | | | | 442/327 |
| 2015/0361218 | A1 | | 12/2015 | Lee et al. | | |
| 2017/0198142 | A1 | | 7/2017 | Hampson et al. | | |

FOREIGN PATENT DOCUMENTS

| CN | 1296507 A | 5/2001 |
|---|---|---|
| CN | 103180364 A | 6/2013 |
| CN | 103480278 A | 1/2014 |
| CN | 103764712 A | 4/2014 |
| CN | 105218847 A | 1/2016 |
| CN | 105358183 A | 2/2016 |
| JP | 2002-509171 A | 3/2002 |
| JP | 2010-275178 A | 12/2010 |
| KR | 10-2001-0034195 A | 4/2001 |
| KR | 10-2013-0033996 A | 4/2013 |
| KR | 10-2013-0055847 A | 5/2013 |
| KR | 10-2015-0144846 A | 12/2015 |
| WO | 2007036501 A2 | 5/2007 |
| WO | 2014069853 A1 | 5/2014 |
| WO | 2016/009054 A1 | 1/2016 |

OTHER PUBLICATIONS (1) Nithianandam et al., "Quinone Amine Polymers. IX. Attempts to Synthesize Polyamine-Benzoquinone Polymers using Air and Oxygen as Oxidizing Agents," Journal of Applied Polymer Science, vol. 42, pp. 2385-2389, John Wiley & Sons, (1991). (Year: 1991).*
Valerie Vreeland, et al., "Polyphenols and Oxidases in Substratum Adhesion by Marine Algae and Mussels", J. Phycol., 34, 1, 1998, pp. 1-8.
Cristina R. Matos-Perez, et al., "Polymer Composition and Substrate Influences on the Adhesive Bonding of a Biomimetic, Cross-Linking Polymer", Journal of the American Chemical Society, 2012, pp. 9498-9505, No. 134.
Bruce P. Lee, et al., "Synthesis and Gelation of DOPA-Modified Poly(ethylene glycol) Hydrogels", Biomacromolecules, American Chemical Society, 2002, pp. 1038-1047, vol. 3, No. 5.

(Continued)

*Primary Examiner* — Kara B Boyle

(57) ABSTRACT

The present invention relates to a curable composition and a use thereof and, more particularly, to a curable composition and a use thereof, the curable composition comprising: (a) a compound capable of being denatured to a quinone-based compound by oxygen; (b) an amine-based polymeric compound; and (c) an oxygen clathrate structure. The curable composition is rapidly cured and can be cured not only at an interface of a conventional film but also to the inside of the film, such that the curable composition has uniform physical properties throughout the entire film and excellent physical properties compared to a curing film obtained by curing at an existing interface.

15 Claims, 2 Drawing Sheets

(56) References Cited

OTHER PUBLICATIONS

Emilie Faure, et al., "Catechols as versatile platforms in polymer chemistry", Progress in Polymer Science, 2013, pp. 236-270, No. 38.
Devin G. Barrett, et al., "pH-Based Regulation of Hydrogel Mechanical Properties Through Mussel-Inspired Chemistry and Processing", Advanced Functional Materials, 2013, pp. 1111-1119, No. 23.
Hyung Joon Cha, et al., "Development of bioadhesives from marine mussels", Biotechnol. J., 2008, pp. 631-638, No. 3.
International Search Report for PCT/KR2017/010695 dated Jan. 24, 2018 (PCT/ISA/210).
CN Office Action dated Mar. 3, 2021.

* cited by examiner

QUINONE CURABLE COMPOSITIONS AND ADHESIVE COMPOSITIONS COMPRISING SAME

CROSS REFERENCE TO RELATED APPLICATIONS

This application is a National Stage of International Application No. PCT/KR2017/010695 filed Sep. 27, 2017, claiming priorities based on Korean Patent Application Nos. 10-2016-0124795 filed Sep. 28, 2016 and 10-2017-0123517 filed Sep. 25, 2017.

TECHNICAL FIELD

The present invention relates to a quinone curable composition capable of producing a curing film that facilitates surface and internal curing, and to an adhesive composition comprising the same.

BACKGROUND ART

Biomimetics refers to the intention to develop new technologies by studying and mimicking the characteristics of organisms that can be seen in nature. Biomimetics studying biomimetic is very helpful in creating new biomaterials, designing new intelligence systems, mimicking bio-structures to create new devices, and designing new optical systems Practical applications related to biomimetic include the gecko tape using the characteristics of seta of the sole of Leopard gecko, the whale power as a wind turbine using the protrusions in the fin of the whale, the Shinkansen high-speed train with reduced noise by mimicking the beak shape of the kingfisher, the mussel adhesive imitated from mussel byssus protein and the like.

Details of mussel adhesive are as follows. The mussel byssus strongly adheres to various surfaces such as rocks, metals and plastics in water, and the analysis on the attached portion reveals that the attached portion contains a large amount of 3, 4-dihydroxy-L-phenylalanine (DOPA) catechol precursor.

Although a clear mechanism for the adhesion function expressed by mussel byssus has not yet been understood, it has been reported that the adhesive force is generated by mutual bonding promoted by oxidizing agents or enzymes in the DOPA part present in byssus. One theory is that during the formation of the adhesive plaque, the quinone functional group is crosslinked with other quinones in the vicinity through radical reaction, or reacts with the amines and thiols in the vicinity through the Michael addition to cause cross-linking [V. Vreeland, J. H. Waite, and L. Epstein, *J Phycol.*, 34, 1 (1998); C. R. Matos-Perez, J. D. White, and J. J. Wilker, *J. Am. Chem. Soc.*, 134, 9498 (2012); B. P. Lee, J. L. Dalsin, and P. B. Messersmith, *Biomacromolecules.*, 3, 1038 (2002).], or the crosslinking is proceeded through the binding of three catechol functional groups to one Fe (III) ion via metal and ion coordination bond [E. Faure, C. Falentin-Daudre, C. Jerome, J. Lyskawa, D. Fournier, P. Woisel, and C. Detrembleur, *Prog. Polym. Sci.*, 38, 236 (2013); D. G. Barrett, D. E. Fullenkamp, L. He, N. Holten-Andersen, K. Y. C. Lee, and P. B. Messersmith, *Adv. Funct. Mater.*, 23, 1111 (2013).].

Mussel adhesives are capable of adhering to a variety of surfaces, including minerals, plastics, metals, glass and biomaterials. Also, unlike conventional chemical adhesives which show a decrease in adhesive force on a wet surface or in water, the mussel adhesive can be adhered even in water. In addition, it is very easy for medical use because it does not attack cells or cause immune reaction even when used directly in living body.

Mussel adhesive for medical use is mainly used as tissue adhesive. As a test, as a result of extracting the mussel adhesive protein and measuring its adhesive force against pig skin, the mussel adhesive protein showed better adhesive force than fibrin glue, but it was somewhat unsuitable for medical use because it requires a curing time of 6-24 hours and a curing temperature of 45° C. beyond the body temperature of 37° C. [H. J. Cha et al., Development of bioadhesives from matine mussels, *Biotechnol. J.* 3, 631-638 (2008)].

Therefore, studies on adhesive polymers with the catechol structure of DOPA mimicking the natural properties of adhesive proteins extracted from mussels have been conducted. Specifically, it was intended to increase the adhesive force and mechanical strength through a method using poly[(3,4-dihydroxystyrene)-co-styrene] which uses 3,4-dihydroxystyrene similar to catechol functional group, but this also failed to secure a stable adhesive force.

As another test, Korean Patent Laid-open Publication No. 2015-0144846 discloses that a functional film (i.e. a curing film) at the interface of a liquid phase and a gas phase can be produced by mixing a catechol-based organic compound and an amine-based polymer, and this functional film can be applied to various fields such as a hemostatic agent, a biocatalyst and a separation membrane as a biomaterial. The above curing reaction occurs mainly on the surface of the functional film on which oxygen exists; since water is present in the inside of the film, the physical properties of the film (e.g., strength and durability) are so low that it is practically difficult to apply to the products; the curing speed is slow; and since the functional film is formed only at the interface where oxygen exists, the formation of the cured film on the surface where oxygen does not pass is limited, (Patent Document 1) Korean Patent Laid-open Publication No. 2015-0144846
(Non-Patent Document 1) V. Vreeland, J. H. Waite, and L. Epstein, *J Phycol.*, 34, 1 (1998)
(Non-Patent Document 2) C. R. Matos-Perez, J. D. White, and J. J. Wilker, *J. Am. Chem. Soc.*, 134, 9498 (2012)
(Non-Patent Document 3) B. P. Lee, J. L. Dalsin, and P. B. Messersmith, *Biomacromolecules.*, 3, 1038 (2002)
(Non-Patent Document 4) E. Faure, C. Falentin-Daudre, C. Jerome, J. Lyskawa, D. Fournier, P. Woisel, and C. Detrembleur, *Prog. Polym. Sci.*, 38, 236 (2013)
(Non-Patent Document 5) D. G. Barrett, D. E. Fullenkamp, L. He, N. Holten-Andersen, K. Y. C. Lee, and P. B. Messersmith, *Adv. Funct. Mater.*, 23, 1111 (2013)
(Non-Patent Document 6) H. J. Cha et al., Development of bioadhesives from matine mussels, *Biotechnol. J.* 3, 631-638 (2008)

DISCLOSURE

Technical Problem

Therefore, as a result of conducting various studies to improve the curing speed of compound having catechol structure and amine-based polymer and physical properties of functional film obtained, the inventors of the present invention have confirmed that the internal curing can be simultaneously performed to improve the physical properties of the film and shorten the curing time by mixing an oxygen-supplying material, i.e. an oxygen clathrate structure, so that the curing can take place not only on the air/solution interface where the oxygen supply is easy, but also in the inside of the solution, and thus completed the present invention.

Therefore, it is an object of the present invention to provide a curable composition capable of producing a curing film which is curable at the air/solution interface and in the inside of the solution and has a fast curing speed.

In addition, it is another object of the present invention to provide the use of the curable composition.

Technical Solution

In order to accomplish the above objects, the present invention provides a curable composition characterized by comprising (a) a catechol-based organic compound capable of being denatured to quinone by oxidation; (b) an amine-based polymeric compound; and (c) an oxygen clathrate structure.

In this case, the oxygen clathrate structure is characterized by comprising an aerogel, a web, a sheet, a foam, a sphere, a tube, a porous structure or a lattice structure containing 1 to 99% of oxygen.

The present invention also provides the use of the curable composition as an adhesive and a coating agent.

Advantageous Effects

The curable composition according to the present invention is cured at a higher speed than the conventional composition containing no an oxygen clathrate structure, and is cured even at the inside of the solution by oxygen released from the oxygen capture structure thereby being cured evenly throughout, and thus when used as an adhesive and a coating agent, has excellent physical properties as compared with the conventional composition. The characteristics may include adhesive force, cohesive force, strength and the like. The curable composition can be applied to most industries requiring a curing film.

DESCRIPTION OF DRAWINGS

FIGS. 3 (a)-3 (d) are photographs of the bonded cross-sections, wherein FIG. 3(a) shows the bonded cross-section of Comparative Example 1 in which the solution containing no aerogels is applied to two facing metal sections, and FIG. 3 (b) is a photograph of the bonded cross-section of Example 1 in which the solution containing aerogels is applied to two facing metal sections. FIGS. 3 (c) and 3(d) are images obtained by scanning electron microscopy of the cross sections of FIGS. 3(a) and 3(b), respectively.

BEST MODE

Figure 1:
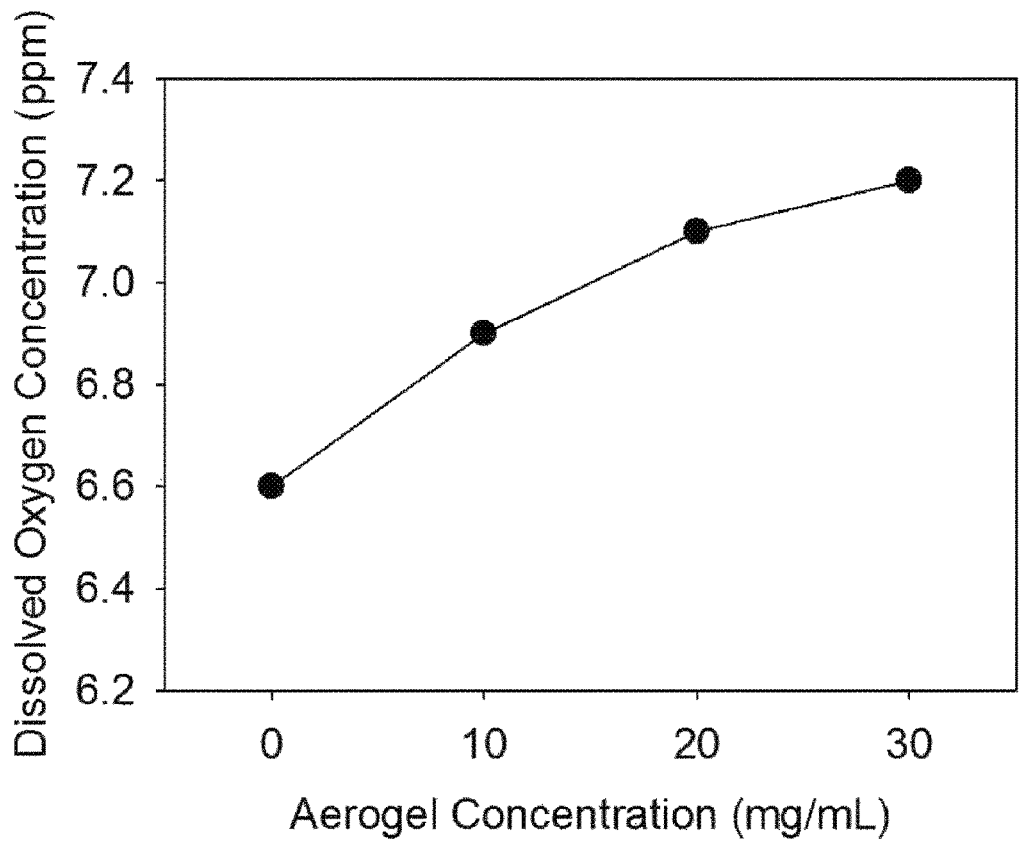
FIG. 1 is a graph showing changes in the dissolved oxygen of water depending on the amount of the aerogels.

Hereinafter, the present invention will be described in more detail.

The curable composition according to the present invention is cured by a quinone curing mechanism.

As shown in the following reaction scheme 1, the 'quinone curing mechanism' means that the structure of catechol is converted to quinone by oxidation and the quinone is cured by a chain network formation reaction with a polymer compound containing an amine group ($NH_2$).

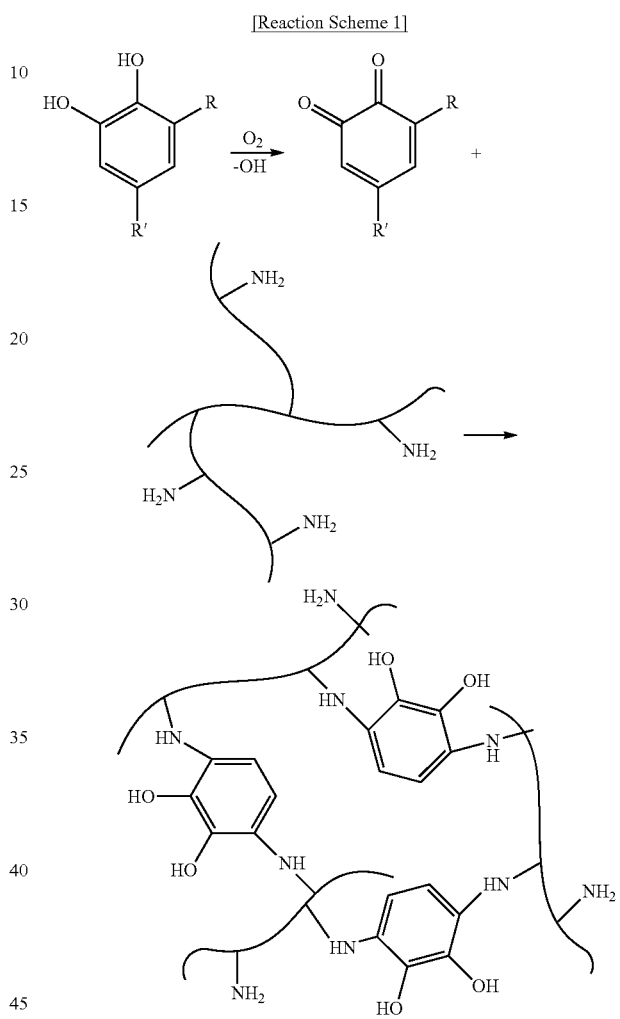

[Reaction Scheme 1]

This quinone curing can be easily proceeded by oxygen in the air without the consumption of energy to be externally applied, i.e., heat or UV light irradiation, as in conventional thermal curing or photo curing.

The curable composition according to the present invention comprises a catechol-based organic compound, which is capable of being oxidized into a quinone-based compound by oxygen, and an amine-based polymeric compound as reactants, so as to enable the quinone curing mechanism. The curing was caused by the reaction between the catechol-based organic compound and an amine-based polymeric compound, but the curing was mainly performed only at the interface capable of reacting with oxygen, and was restricted in the inside of the curing film applied for curing, so that there were many restrictions on the use of such a composition as an adhesive or coating material.

Accordingly, in the present invention, an oxygen clathrate structure is used so that the curing can be performed not only at the interface but also in the inside of the curing film, and the speed of the curing reaction can be improved.

The oxygen clathrate structure refers to a substance capable of containing oxygen in the structure and capable of supplying oxygen so that the oxidation reaction of the catechol-based organic compound is proceeded.

The oxygen clathrate structure that can be used is not particularly limited in the present invention, but it is preferable that the oxygen clathrate amount is high and oxygen can be easily supplied to the inside of the curing film.

The oxygen clathrate amount in the oxygen clathrate structure is preferably 1 to 99%, and preferably 3 to 90%. In addition, the oxygen may be not only the oxygen contained in the air, but also high purity or highly compressed oxygen.

Also, it is preferable that the oxygen clathrate structure has a porous property in which pores exist in the structure in order to easily supply oxygen which facilitates the oxidation reaction of the catechol organic compound. At this time, although different depending on the shape of the structure, it is advantageous to have a porosity of 10 to 99%, preferably 15 to 96%.

In addition, it is preferable that the oxygen clathrate structure of the present invention does not deteriorate the physical properties of the cured film formed after application of the curable composition, and it is further preferred that the oxygen clathrate structure of the present invention improves the physical properties of the cured film. It is preferable that the oxygen clathrate structure is uniformly applied to the curing film so that the internal curing can occur simultaneously at a high speed. If the particles are too large or heavy, there is a concern that the curing may occur only at one side (lower region) while at the other side (upper and side regions) the curing may occur only at the interface.

The preferred oxygen clathrate structure is not particularly limited in the present invention as long as it is capable of supplying oxygen. The oxygen clathrate structure may typically be an aerogel, a web, a sheet, a foam, a sphere, a tube, a porous structure or a lattice structure, preferably in the form of a gel, a web or a microsphere.

The term "aerogel" refers to a solid-state material that is filled with gas instead of liquid in the gel. The aerogel comprises 90 to 99.9% of air, has a density of 3 to 150 mg/cm$^3$, forms a porous structure having a pore size of 0.1 to 100 nm in the form of a net, and has itself hydrophilic property. The aerogels can be made of a variety of materials, and include aerogels made of silica, aluminum, chromium, tin, carbon, sodium, calcium and the like, and two or more of these materials.

The term "web" means that the fibrous aggregate or film is mechanically or chemically combined from each other by suitable water or heat. Such a web means a molding product with flat structure manufactured by tangling various kinds of fibers of glass, metal, polymer, or hybrid material thereof depending on their mutual characteristics to form a sheet-like web and then bonding by mechanical or physical methods. The web has an average pore size of 1 nm to 100 µm, a porosity of 1 to 70%, and a thickness of 1 nm to 1000 µm.

The term 'sheet' refers to a porous sheet produced by wet coating, extrusion, sheet molding or calendering. The material of the sheet may be a metal, a metal oxide, a polymer, or a hybrid material thereof. The sheet has an average pore of 1 nm to 100 µm, a porosity of 1 to 70%, and a thickness of 1 nm to 1000 µm.

The term 'foam' also is referred to as a sponge, and means one in which at least 90% of the volume forms pores, i.e., open cells, which have a three-dimensional mesh structure and have a structure in which individual pores are completely continuous. The sponge is produced through the foaming process. The material of the sponge may be any metal or polymer that can be foamed. Examples of the sponge may include a Ti sponge, a polyethylene sponge, a polyurethane sponge, a rubber sponge, a polyvinyl alcohol sponge and the like, which have excellent hydrophilic depending on the material. In this case, the density of the sponge is 1 to 300 mg/cm$^3$, and the pore size ranges from nanometer level to the micron level. The sponge has various sizes of pores.

The term 'sphere (microsphere)' refers to a spherical shape of a particle. The sphere may be a nanosphere having a nanoscale diameter, and a microsphere having a micrometer level depending on its size, and may be a hollow sphere of hollow shape with an empty interior or a porous sphere having pores formed therein depending on its shape. For example, the sphere may be a hollow nanosphere with an empty interior and a nanoscale diameter. The sphere has a pore diameter of 1 nm to 100 µm, a porosity of 10 to 99%, and a thickness of 1 nm to 1000 µm.

The term 'tube' has a cylindrical, cylindrical or spiral cylindrical shape and means one that can contain oxygen within the tube and between the tubes. Preferably, the tube may be a metal nanotube, a metal oxide nanotube, and a carbon nanotube, and has a diameter of from 1 to 5000 nm and a length of from 1 nm to 1000 µm.

The term 'porous structure' refers to a structure in which about 15 to 95% of the volume is composed of pores, which has or can impart new properties not possessed by existing dense materials.

The term "lattice structure" means a structure in which pores arranged and connected to each other in a lattice form are stacked. At this time, the pores may be connected to each other to form open pores. The average pore size of the structure is 1 nm to 100 µm, the porosity is 10 to 99%, and the thickness is 1 nm to 1000 µm. The lattice structure may be a well-known method such as a method of stacking wires, a method of assembling three-dimensionally, or a method of preparing a structure for pore formation and then removing it.

In this case, the material of the oxygen clathrate structure is not particularly limited, and may be at least one selected from the group consisting of a metal, a metal oxide, a glass, a carbon material and a polymer, or a combination of two or more thereof.

The metal material may be preferably a material which is not corrosive to water and oxygen because water is used as a solvent for the curable composition and oxygen must be encapsulated, and is not particularly limited. Examples of the metal material may be at least one selected from the group consisting of W, Mo, V, Ti, Al, Be, Zr, Au, Pt, Cu, Cr, Zn, Mo, Ag, Rh, Pa, La, Ir, Kr, Nd, Nb, Ru, In, Y, Z, and stainless steel, or a mixture of two or more thereof, and preferably may be Ti.

The metal oxide may be at least one compound selected from the group consisting of $SiO_2$, $TiO_2$, $ZrO_2$, $CeO_2$, $Al_2O_3$, $B_2O_3$, ZnO, BaO, MgO, CaO, and $BaCa(CO_3)_2$, and preferably may be $SiO_2$.

The glass may be a known glass such as soda lime glass, calcium lime glass, lead glass, barium glass, and silicate glass, and is not particularly limited in the present invention.

The carbon material may be carbon fiber, carbon black, carbon nanotube (CNT), graphite, graphene, activated carbon, and the like, and is not particularly limited in the present invention.

The polymeric material can be a natural polymer or a synthetic polymer, and the synthetic polymer can be used both a thermoplastic resin and a thermal curable resin. For example, the thermoplastic resin includes polyethylene, polypropylene, polycarbonate, polystyrene, polyacrylate, nylon, polyester, polyvinyl alcohol, polyamide, polyimide, polyacetal, polysulfone, polyethersulfone, polyketone and the like. The thermal curable resin includes phenol resin, melamine resin, epoxy resin, unsaturated polyester resin and the like. In addition, various well-known polymer materials may be used and are not particularly limited in the present invention.

Preferably, the oxygen clathrate structure proposed in the present invention can be activated carbon, activated carbon fiber, $TiO_2$ hollow spheres, glass web, silica aerogels, fumed silica nanoparticles, $SiO_2$ hollow particles, $TiO_2$ hollow particles, silica nanotubes and carbon nanotubes in terms of both the nature and state of the material.

The oxygen clathrate structure varies depending on the oxygen clathrate ratio but is included in the curable composition in an amount of 1 to 99 wt. %, preferably 2 to 99 wt. %, based on the solid content. If the content is less than the above range, the inside of the curing film may be uncured, and if the content exceeds the above range, the physical properties of the cured film may be deteriorated. Therefore, it is preferable that the content is suitably used within the above range.

If the shape of the oxygen clathrate structure is a web, a sheet or a foam, the oxygen clathrate structure may be included in an amount of preferably 10 to 99 wt. %, more preferably 15 to 99 wt. % in the curable composition based on the solid content. That is, in the case of the web, sheet, and foam, since the polymer itself is coated on the polymer, the content of the oxygen clathrate structure based on the solid content is inevitably relatively high.

If the shape of the oxygen clathrate structure is an aerogel, a sphere, a tube, a lattice structure or a polymer fiber, the oxygen clathrate structure may be included in an amount of preferably 1 to 50 wt. %, more preferably 1 to 20 wt. % in the curable composition based on the solid content.

The curable composition according to the present invention includes a catechol-based organic compound for quinone curing and an amine-based polymeric compound as already mentioned.

The catechol-based organic compound refers to a compound having a structure in which two hydroxy groups are linked to the benzene ring, which can be oxidized to a quinone state through reaction with oxygen, and can have a variety of functional groups on carbon that is not connected to a hydroxy group. The catechol-based organic compound may be at least one selected from the group consisting of L-dopa, pyrogallol, dopamine, pyrocatechol, norepinephrine and 3,4-dihydroxycinnamic acid (DHCA), and preferably may be pyrogallol, which preferably has a rapid oxidation characteristic by oxygen.

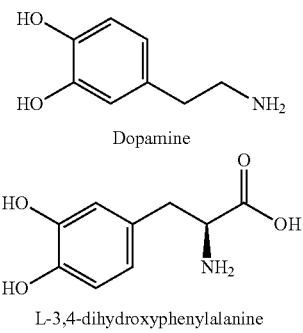

Dopamine

L-3,4-dihydroxyphenylalanine

-continued

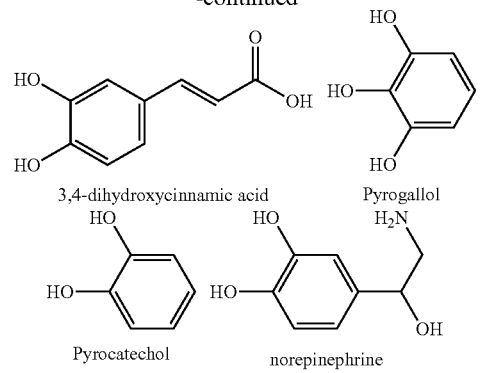

3,4-dihydroxycinnamic acid    Pyrogallol

Pyrocatechol    norepinephrine

The catechol containing compound may be the single compound, but any type of compound is possible as long as they are present in the molecular structure. For example, the catechol-based organic compound may be attached to the backbone or side chain of a polymer by a functional group.

The content of the catechol-based organic compound may vary depending on the physical properties or application of the final cured film, and is used in an amount of 3 to 90 wt. %, preferably 5 to 50 wt. %, based on the solid content, in the curable composition. There is a concern that if the content is less than the above range, the quinone curing does not occur sufficiently, so that the physical properties (strength and adhesive force, etc.) of the cured film are lowered, and on the contrary, if the content exceeds the above range, the content of the other composition may be reduced, and thus the physical properties of the cured film may be deteriorated. Therefore, the content is appropriately used within the above range.

The amine-based polymeric compound is a material containing an amine group in the molecular structure wherein the amine group is cured by chemical bond with the quinone of the oxidized catechol-based organic compound as shown in Reaction Scheme 1.

In this case, the amine-based polymer having an amine group at the main chain, side chain, or terminal is preferably used for the formation of the cured film, and the representative amine-based polymer is not limited in the present invention, and all known polymers can be used. Preferably, the amine-based polymer may be at least one selected from polyethyleneimine, polyamines, polyamideamine, polyvinylamine, polyamidoimine, polyallylamine, poly-L-lysine, chitosan alone, copolymers thereof, and blends thereof, and preferably may be polyimine-based polymers such as polyethyleneimine, or polyamine-based polymers such as polyethyleneamine, polyethylene diamine, polydiaminepropane, and polyhexamethylenediamine, and more preferably may be polyethyleneimine.

The content of the amine-based polymeric compound may vary depending on the physical properties or application of the final cured film, and is used in an amount of 3 to 90 wt. %, preferably 60 to 90 wt. %, based on the solid content, in the curable composition. There is a concern that if the content is less than the above range, the formation of the cured film may be difficult, and on the contrary, if the content exceeds the above range, the content of the other composition may be reduced, and thus the physical properties of the cured film may be deteriorated. Therefore, the content is appropriately used within the above range.

The curable composition, including the oxygen clathrate structure, the catechol-based organic compound and the amine-based polymeric compound as described above, may vary depending on the application but may further include additives known in various fields.

Examples of usable additives include plasticizers, colorants, preservatives, heat dispersants, biocompatible agents, preservatives, stabilizers, and the like, and are not particularly limited. At this time, the content of the additives is added within a range that does not affect the curing, and preferably in less than 10 wt. % in the total composition.

The curable composition described above is converted to quinones by oxidation of the catechol derivatives, which form a cured film through curing reaction with the amine-based polymeric compounds.

The curing film is cured not only on the surface but also in the inside thereof, and thus has an advantage of being excellent in adhesive force, cohesive strength, strength and durability, and significantly shortening the curing time. Therefore, the curing film can be used in any field where it can be formed, and is not particularly limited in the present invention.

For example, the curable composition is applicable to adhesives for various adhesions, coatings, and separation membranes capable of selectively permeating gases or liquids, and is applicable to biocatalysts containing proteins and cells in biomedical applications, hemostatic agents for stopping or preventing bleeding, barriers for blocking moisture, scaffolds for tissue construction, and the like. In addition, the curable compositions can also be used as functional adhesives for aircraft, automobile, ship, rocket, hot air balloon, mechanical parts, electronic devices, electronic components, optical fibers and lenses, along with general-purpose applications, since it can be adhered to a wide range of adherends such as paper, metal, fiber, wood, plastic, glass, and ceramics for industrial use.

For example, the curable composition according to the present invention can be used as an adhesive.

An adhesive has a special property that bonds an object with an object. In order to act as the adhesive, first, it is necessary to closely adhere to the object to be bonded, and second, the adhesive itself must have a proper strength after the adhesion. The curable composition according to the present invention instantaneously reacts by the quinonization of catechol and the reaction with amine, and induces adhesion, and thus enhances the adhesive force between adherends by high adhesive strength.

In this case, the adherend is not limited in the present invention in terms of its material. For example, it is possible to apply to various parts such as metal, paper, fiber, silicon substrate and glass. It can be seen that the cured film formed after application of the curable composition according to the present invention has a high level of shear strength and is excellent in an adhesive force (see, Experimental Examples 2 to 4).

The curable composition according to the present invention can be suitably used as a medical adhesive among adhesives.

The medical adhesive must be in direct contact with the skin or tissue, so that it is not toxic or harmful under stringent conditions, and it requires more rigorous biocompatibility and biodegradability. The medical adhesive currently commercialized may be cyanoacrylate instant adhesive, fibrin glue, gelatin glue, polyurethane-based adhesive and the like, but does not fully satisfy the above conditions. Therefore, recently, a polyethylene imine based (PEI) adhesive has been proposed, but this adhesive has the problem that it is toxic for medical use.

Accordingly, the curable composition of the present invention can be suitably used as a substitute material of conventional medical adhesives by using the amine-based polymeric compound and the catechol-based organic compound.

In particular, it can be used for tissue replantation among medical adhesion. The replantation of damaged tissue was performed using a mechanical bonding material such as a suture, a stapler, and a wire. However, when the curable composition according to the present invention is used, it can be easily applied to a wound site. As a result, there are advantages that there are few secondary injuries, there is little pain and removal of sutures is unnecessary, and the hemostatic effect and air leakage prevention effect are excellent, compared to the suture or the stapler.

In this case, the medical adhesive may further include a therapeutic drug for use. Examples of the therapeutic agent may include human growth hormone, erythropoietin, interferon, insulin, interleukin, calcitonin, growth factor (G-CSF), angioprotein, VEGF-Trap, monoclonal antibody, antibody fragment as a drug containing a poorly soluble drug, a therapeutic peptide, a protein and an antibody, and hemostatic proteins, antibiotics, or analgesics may be further included in the curable composition, and angina pectoris treatment that requires emergency administration below the tongue, allergen extract, which is used as a sublingual immunotherapy for asthma and allergic rhinitis, antihistamine, an anti-allergic agent, and the like can be included, and the therapeutic drug is not particularly limited.

Hereinafter, preferred Examples and Comparative Examples of the present invention will be described. However, the following Examples are merely preferred Examples of the present invention and the present invention is not limited to the following Examples.

EXAMPLES

Experimental Example 1: Analysis of Change of Dissolved Oxygen with an Oxygen Clathrate Structure In order to confirm the change of dissolved oxygen amount by the oxygen clathrate structure, the aerogels (main material: silica, porosity of 90% or more, hydrophilic, Guangdong Alison High-tech) were dispersed in 15 mL of water at a concentration of 10, 20 and 30 mg/mL to analyze the amount of dissolved oxygen.

FIG. 1 is a result of the measurement of the dissolved oxygen amount dissolved in water at a temperature of 25.6±0.2° C. Referring to FIG. 1, 6.6 ppm of oxygen is dissolved in water that does not use the oxygen clathrate structure, but when the oxygen clathrate structure is contained at concentrations of 10, 20, and 30 mg/mL, the dissolved oxygens were 6.9, 7.1, and 7.2 ppm respectively.

As shown in FIG. 1, the dissolved oxygen in water was increased when the oxygen clathrate structure is included and the concentration is increased, and through this, it was confirmed that oxygen can be provided by the clathrate structure.

Experimental Example 2: Promotion or Non-Promotion of Oxidation of Catechol Compound Depending on Use or Non-Use of Oxygen Clathrate Structure In order to confirm the promotion or non-promotion of the oxidation of catechol compound depending on the use or non-use of the oxygen clathrate structure, four tubes were prepared and the degree of oxidation (color change) of the solution was compared while varying the content of the oxygen clathrate structure in each tube. The quinone organic compound has a dark brown color. The color of the catechol organic compound changes to brown as the oxidation is proceeded.

The aerogels (main material: silica, porosity of 90% or more, hydrophilic, Guangdong Alison High-tech) were selected as an oxygen clathrate structure, and a pyrogallol solution (0.2M) was prepared by adding 25.2 g of the pyrogallol to 1 L of water. Each tube was filled with the oxygen clathrate structure of 0 mg (Preparation Example 1), 10 mg, 20 mg, 30 mg (Preparation Examples 2, 3, 4). Mixed solutions of the pyrogallol/aerogel were prepared by adding 1 mL of 0.2 M pyrogallol solution to each tube, and the color changes immediately after vortexing for 30 seconds for evenly mixing and after 24 hours were checked. A photograph comparing the degree of oxidation of the catechol compound was shown in FIGS. 2(a)-2(b) below.

Figure 2:
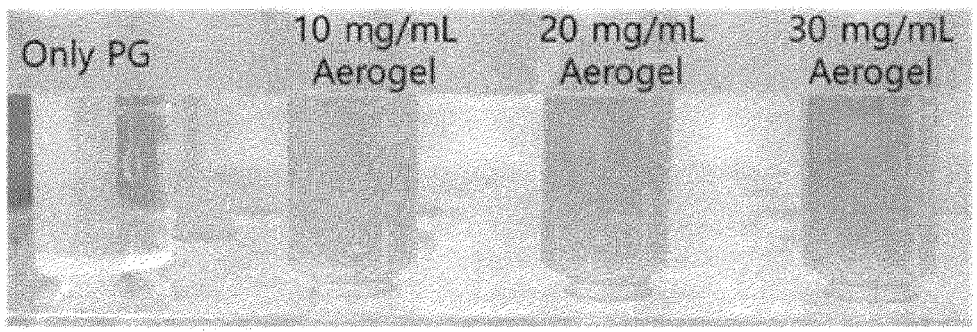
FIGS. 2 (a)-2 (b) are photographs comparing Examples 1, 2, and 3 containing aerogels by concentration (1%, 2%, 3%) with the solution of the catechol-based organic compound (Comparative Example 1) containing no aerogels wherein (a) is a photograph taken within 5 minutes after mixing, and (b) is a photograph taken after 24 hours.
Figure 2:
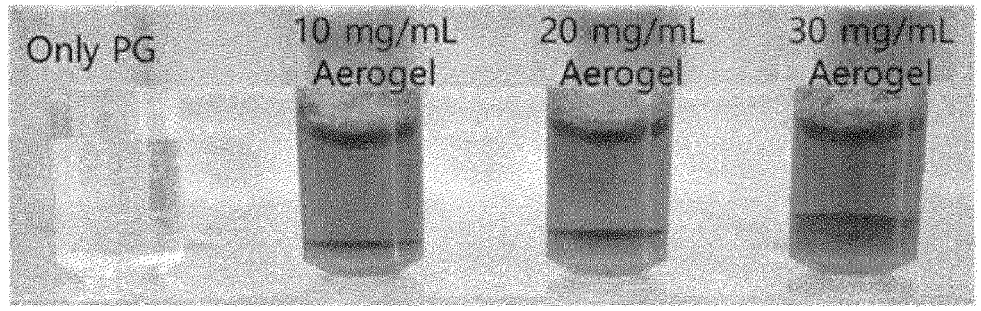

FIG. 2 (a) is a photograph immediately after vortexing for 30 seconds after the aerogels were mixed, and FIG. 2 (b) is a photograph after 24 hours. At this time, Only PG is the pyrogallol solution of Preparation Example 1, and each of 10 mg/mL, 20 mg/mL, and 30 mg/mL is the mixed solution of the pyrogallol/aerogel.

In FIG. 2(a), the 'Only PG' of Comparative Example 1 retained the clear color immediately after mixing because the oxidation of the catechol compound was slowed down. Compared with this, the mixed solution of the pyrogallol/aerogel containing the aerogels was found to rapidly oxidize catechol derivatives by supplying oxygen into the solution through the pore of the aerogel.

FIG. 2 (b) is a photograph showing oxidation after 24 hours. It was found that the pyrogallol solution was slightly changed to light yellow. The mixed solution of the pyrogallol/aerogel containing the aerogels shows that the oxidation was further proceeded specifically not only at the air/liquid interface but also at the top of the submerged aerogels.

It was confirmed from the results of FIGS. 2 (a) and (b) that when the oxygen clathrate structure according to the present invention is used, the oxidation of the catechol derivatives is promoted by supplying oxygen around the oxygen clathrate structure as well as at the air/liquid interface.

Experimental Example 3: Analysis of Adhesive Force of Metal Specimen Depending on the Type of Oxygen Clathrate Structure (1) Curable Composition A 20 wt./vol. % solution of PEI (polyethyleneimine, Mw: 750 kDa) was prepared using water as a solvent. A 0.2 M solution of the pyrogallol was prepared using water as a solvent. Various oxygen clathrate structures were mixed with the pyrogallol solution and the PEI solution to prepare the curable compositions as shown in Table 1.

The aerogels (main material: silica, hydrophilic, porosity of 90% or more, Guangdong Alison High-tech), the fumed silica nanoparticles (main material: silica, hydrophilic, EONONIC, AEROSIL® 200), the silica hollow particles (main material: silica, hydrophilic, diameter of nm, RS, Koryo Innotech), the silica nanotubes (main material: silica, hydrophilic, diameter 100 nm, SNT, Koryo Innotech), and the glass web (silica, hydrophilic, 1035MS, Asahikasei) were selected as an oxygen clathrate structure and evaluated.

(2) Measurement of Adhesive Force

In order to confirm the adhesion property, two Cu plates (1.2 mm in thickness) were prepared at a size of 30×15 mm$^2$, and then the prepared solution was applied thinly to 10×15 mm$^2$ area in one specimen by 20 uL, and two specimens were bonded to each other and left at 50° C. for 5 hours to induce the quinone curing.

In the case of using the glass web as an oxygen clathrate structure (Example 5), the glass web was cut into a size of 10×15 mm$^2$, which is the size of the bonding specimen.

The shear strength was measured by applying a tensile force at a rate of 5 mm/min to the substrates prepared in the Examples and Comparative Examples using a Universal Testing Machine (INSTRON 5583). At this time, the results are shown as mean values of five samples measured, and it means that the higher the value is, the better the adhesive force is.

(3) Result

The composition of the curable composition and the resultant shear strength are shown in Table 1 below. At this time, Comparative Example 1 is an example without an oxygen clathrate structure, and Comparative Example 2 is an example using a commercially available adhesive (cyanoacrylate).

TABLE 1

| Item | PEI solution (20 wt/vol %) | Pyrogallol solution (0.2M) | Oxygen clathrate structure Kind | Content | Shear strength (MPa) |
|---|---|---|---|---|---|
| Example 1 | 1 ml | 1 ml | Aerogel | 60 mg | 0.99 |
| Example 2 | 1 ml | 1 ml | Fumed silica nano-particle | 60 mg | 0.98 |
| Example 3 | 1 ml | 1 ml | Silica hollow particle | 60 mg | 0.65 |
| Example 4 | 1 ml | 1 ml | Silica nanotube | 60 mg | 0.71 |
| Example 5 | 1 ml | 1 ml | Glass web | 4.6 mg (size 10 × 15 mm$^2$) | 0.95 |
| Comparative Example 1 | 1 ml | 1 ml | — | — | 0.42 |
| Comparative Example 2 | — | — | — | — | 1.15 |

Referring to Table 1, it can be seen that the cured films prepared in Examples 1 to 5 using the oxygen clathrate structure according to the present invention have excellent shear strength.

Figure 3:
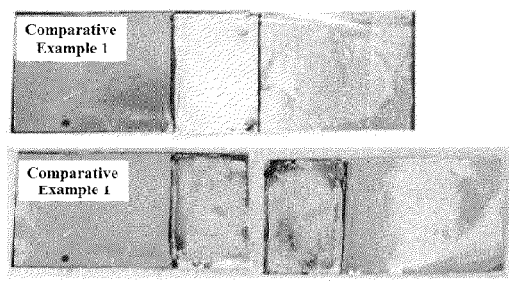
Figure 3:
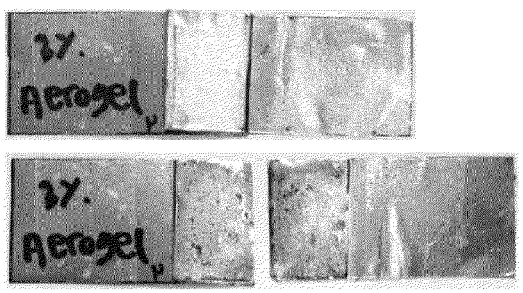
Figure 3:
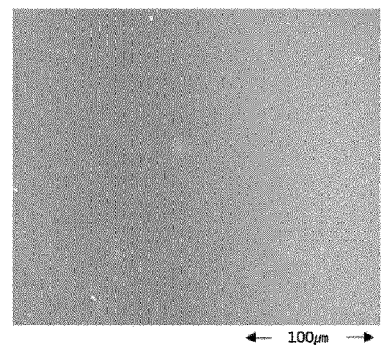
Figure 3:
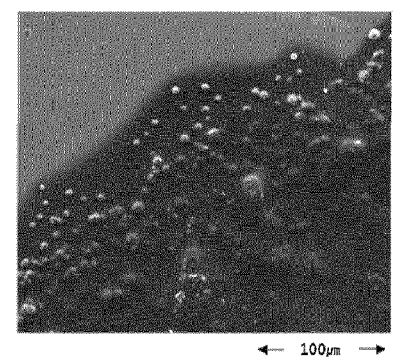

FIG. 3(a) is a photograph showing the bonded cross section of Comparative Example 1 which does not include the aerogels, which means that the corner was cured by oxygen, but the inside was blocked from the air and thus the curing did not occur.

FIG. 3(b) is an image showing the bonded cross-section of Example 1 including an aerogel, which means that when compared with FIG. 3(b), the color was changed evenly and the curing was occurred to the inside.

FIG. 3(c) is a cross-sectional scanning microscope image of Comparative Example 1, and FIG. 3(d) is a cross-sectional scanning microscope image of Example 1. By comparing FIGS. 3(c) and (d), it can be seen that in contrast to FIG. 3(c) showing a smooth surface, FIG. 3(d) shows the surface containing the particles, which means the presence of the aerogels.

The invention claimed is:

1. A curable composition comprising,
    (a) a catechol-based organic compound capable of being denatured to quinone by oxidation;
    (b) an amine-based polymeric compound; and
    (c) an oxygen clathrate structure.

2. The curable composition according to claim 1, wherein the oxygen clathrate structure is included in the entire curable composition in an amount of 1 to 99 wt. %.

3. The curable composition according to claim 1, wherein the catechol-based organic compound comprises functional groups of two or more hydroxyl groups in the benzene ring and is a compound that can be oxidized by oxygen.

4. The curable composition according to claim 3, wherein the catechol-based organic compound is at least one selected from the group consisting of L-dopa, pyrogallol, dopamine, pyrocatechol, norepinephrine and 3,4-dihydroxycinnamic acid (DHCA).

5. The curable composition according to claim 1, wherein the amine-based polymeric compound is a polymer having an amine group in the molecular structure.

6. The curable composition according to claim 5, wherein the polymer having an amine group is at least one selected from polyethyleneimine, polyamine, polyamideamine, polyvinylamine, polyamidoimine, polyallylamine, polylysine, and chitosan.

7. The curable composition according to claim 1, wherein the oxygen clathrate structure has at least one shape selected from the group consisting of an aerogel, a web, a sheet, a foam, a sphere, a tube, a porous structure or a lattice structure.

8. The curable composition according to claim 1, wherein the oxygen clathrate structure is at least one selected from the group consisting of activated carbon, activated carbon fiber, $TiO_2$ hollow spheres, glass web, silica aerogels, fumed silica nanoparticles, $SiO_2$ hollow particles, $TiO_2$ hollow particles, silica nanotubes and carbon nanotubes.

9. The curable composition according to claim 1, wherein the oxygen clathrate structure has an oxygen clathrate amount of 1 to 99%.

10. The curable composition according to claim 1, wherein the oxygen clathrate structure has a porosity of 10 to 99%.

11. The curable composition according to claim 1, wherein the oxygen clathrate structure is at least one selected from the group consisting of metals, metal oxides, glass, carbon materials and polymers.

12. The curable composition according to claim 1, wherein the curable composition is cured in the presence of oxygen.

13. The curable composition according to claim 1, wherein the curable composition is internally cured by oxygen supplied from the oxygen clathrate structure.

14. An adhesive composition comprising the curable composition according to claim 1.

15. A coating composition comprising the curable composition according to claim 1.

* * * * *